United States Patent
Ambaljeri et al.

(10) Patent No.: US 11,256,573 B1
(45) Date of Patent: Feb. 22, 2022

(54) METHOD OF CATEGORIZING DATA AND ITS BACKUP DESTINATION

(71) Applicant: EMC IP Holding Company LLC, Hopkinton, MA (US)

(72) Inventors: Mahantesh Ambaljeri, Karnataka (IN); Jafarullah Noordeen, Karnataka (IN); Iresha Gadikar, Karnataka (IN); Sunil Amban Kandambeth, Karnataka (IN); Venkatraman Venkatasubramanyam, Tamilnadu (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 15/709,938

(22) Filed: Sep. 20, 2017

(51) Int. Cl.
*G06F 11/14* (2006.01)

(52) U.S. Cl.
CPC ...... *G06F 11/1451* (2013.01); *G06F 11/1461* (2013.01); *G06F 11/1464* (2013.01)

(58) Field of Classification Search
CPC .. G06F 12/00; G06F 11/1451; G06F 11/1461; G06F 11/1464
USPC .......................................................... 711/162
See application file for complete search history.

(56) References Cited

U.S. PATENT DOCUMENTS

| | | | | |
|---|---|---|---|---|
| 6,704,849 | B2* | 3/2004 | Steegmans | G06F 11/1456 709/217 |
| 2002/0107877 | A1* | 8/2002 | Whiting | G06F 11/1453 |
| 2009/0228599 | A1* | 9/2009 | Anglin | G06F 3/0608 709/231 |
| 2010/0030984 | A1* | 2/2010 | Erickson | G06F 11/1456 711/162 |
| 2010/0058011 | A1* | 3/2010 | Satoyama | G06F 11/1458 711/162 |
| 2013/0018946 | A1* | 1/2013 | Brown | G06F 11/1451 709/203 |
| 2014/0289202 | A1* | 9/2014 | Chan | G06F 9/54 707/652 |
| 2015/0324255 | A1* | 11/2015 | Kochunni | G06F 11/1448 711/162 |

* cited by examiner

*Primary Examiner* — Gautam Sain
(74) *Attorney, Agent, or Firm* — Workman Nydegger

(57) ABSTRACT

In one example, a method can be performed that involves receiving a backup request specifying: one or more files to be backed up; a group of one or more categories, each of which corresponds to a respective range of file sizes; and, one or more storage destinations, categorizing each of the files by assigning a respective category to each file, initiating a respective backup datastream corresponding to each category that has been assigned, and requesting that each backup datastream be backed up at the respective storage destination that corresponds to the assigned category associated with that backup datastream.

18 Claims, 3 Drawing Sheets

METHOD OF CATEGORIZING DATA AND ITS BACKUP DESTINATION

FIELD OF THE INVENTION

Example embodiments of the invention relate to systems and methods for managing data. More particularly, at least some embodiments of the invention relate to systems and methods for categorizing data that is targeted for backup, and then backing up the data at one or more locations based on the category or categories that have been applied to that data.

BACKGROUND

Entities typically generate and use data that is important in some way to their operations. This data can include, for example, business data, financial data, and personnel data. Accordingly, entities create and store backups of their important data that can later be used in a data restore process if necessary.

Generally, entities have found it convenient, when storing a backup, to store the entire backup in a single location. This approach can enable a relatively simple and uncomplicated backup process. Moreover, access to the stored backup is relatively straightforward, as least insofar as a user has assurance that all the data of a particular backup of interest is stored in a single location.

Despite these advantages however, conventional approaches to the storage and use of backups such as those just described have proven problematic in some regards. For example, the backup is largely stored without regard to subsequent ease of access should a user need to access particular elements of the backup. That is, the backup is stored in a way that may be relatively efficient in terms of execution of the backup process, but which may not be well suited to support subsequent user access.

As another example of technological problems with conventional backup processes, a user desiring to access a particular file may be compelled to restore the entire backup in order to gain access to that file since there is no mechanism available to the user to identify and select that particular file from the stored backup. This is both inconvenient and time consuming, particularly if the backup is relatively large and/or if the backup includes one or more relatively large files.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
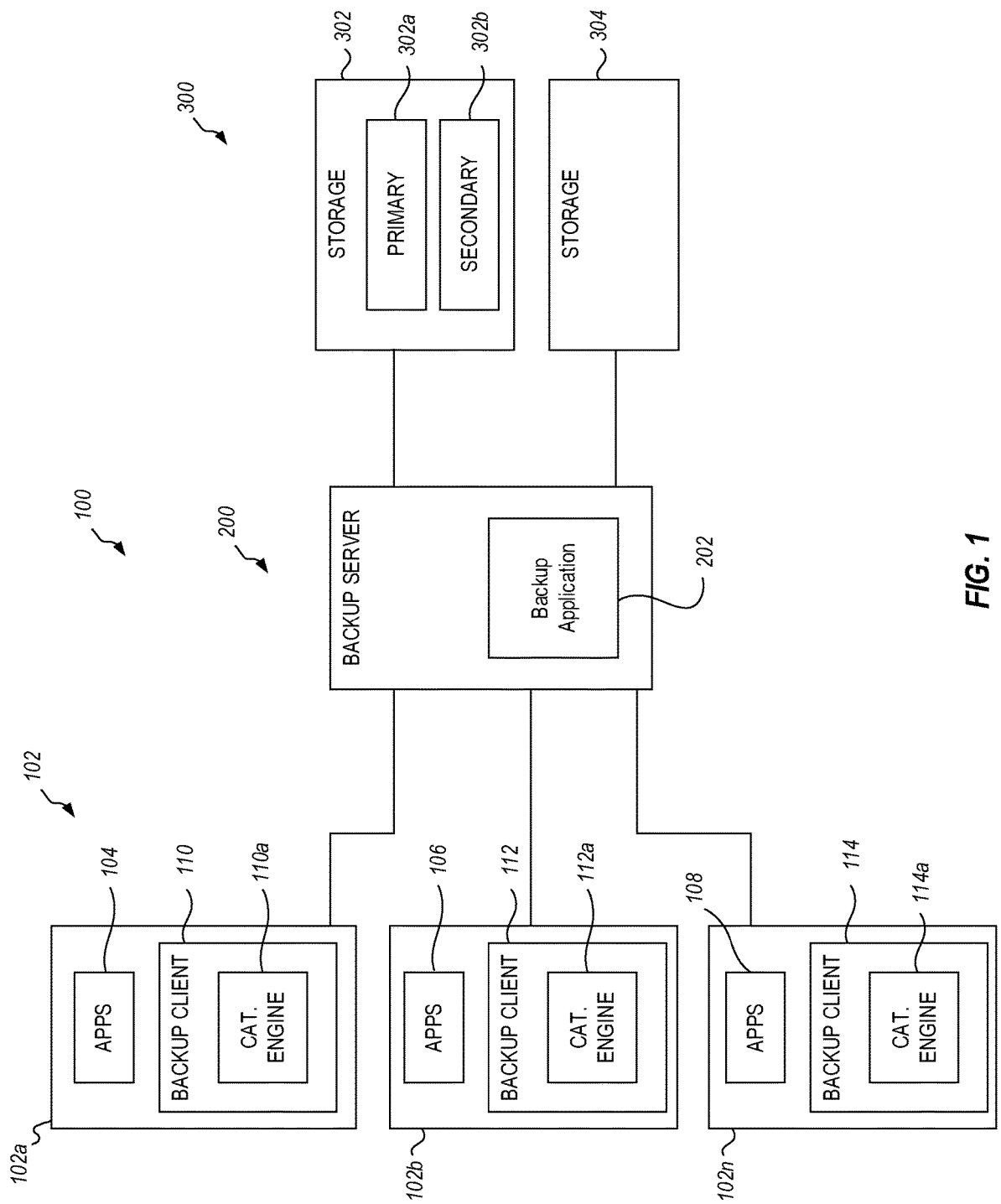
FIG. 1 illustrates an example of an operating environment in which data categorization, backup, and restoration may be performed.

Example embodiments of the invention generally relate to systems and methods for managing data. More particularly, at least some embodiments of the invention concern systems, hardware, software, computer-readable media, and methods directed to data backup processes based on backup data categorization. In light of the technological problems noted herein, and others, what is needed are ways to improve backup processes so that a user may identify, in a backup dataset or saveset, a specific file, or group of files, that the user wants to access, without having to perform a full restore of the backup. It would also be useful to enable a user to access the file, or files, of interest without having to actually restore that file, or files. It would further be advantageous for the user to be able to identify and access the file(s) of interest, without a requirement that the user know the identity of the particular restore point with which those files are associated.

Thus, at least some embodiments of the invention may solve one or more of the technological problems noted herein by providing processes for optimized storage of backup data wherein, within a particular backup dataset or saveset, data of different respective categories is stored in different respective locations according to category. At least some particular embodiments of the invention provide for the categorization of some or all of the files in a backup dataset according to the size of the files, and such embodiments also provide for the storage of the files in corresponding locations according to their respective assigned categories. That is, the files that make up a particular backup dataset may be stored in different respective locations based on their respective file sizes.

This approach to backing up data may be counterintuitive as the backup process may be rendered relatively more complicated by the requirement to store different files in different locations. Advantageously however, the categorization process may enable relatively large files of a backup dataset, such as video files and drawing files, including computer aided design (CAD) files for example, to be stored in a location, or locations, separate from a location where relatively smaller files of the backup dataset are stored.

When such an approach is employed, it is relatively easy for a user to find a large file that the user wishes to access, since the large files are stored in a separate location from the other files of the backup dataset. This is particularly so in circumstances where a backup dataset includes relatively few large files. Because the large files are relatively easy to locate, there is no requirement for the user to know the identity of the restore point associated with the file of interest, nor is there any need for the user to perform the time consuming process of a full restore in an attempt to find the file of interest. Rather, instead of restoring the file of interest, the user can simply locate the file, such as with a search command, mount that file at the user site, and then access the mounted file directly.

Finally, embodiments of the invention implement technological advances and improvements inasmuch as they contribute to a relative increase in the speed of existing backup processes. In particular, multiple savestreams are used to back up the files in the backup dataset to multiple locations. Because the data in the various savestreams may be backed up simultaneously, or the savestreams may at least overlap in time to some extent, the backup proceeds relatively more quickly than if only a single savestream were employed.

A. Example Operating Environment

The following is a discussion of aspects of example operating environments for various embodiments of the invention. This discussion is not intended to limit the scope of the invention, or the applicability of the embodiments, in any way.

In general, embodiments of the invention may include and/or be implemented in connection with a storage environment which may comprise, or consist of, a storage array. The storage environment can take various forms, including a cloud storage environment, an on-premises storage environment, or a hybrid storage environment that includes public and private elements, although the scope of the invention is not limited to any particular type of storage environment.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as filesystem, document, file, block, or object may be used by way of example, the principles of the disclosure are not limited to any particular form of representing, organizing, or storing, data or other information. Rather, such principles are equally applicable to any object capable of representing information.

With reference now to FIG. 1, details are provided concerning aspects of an operating environment for at least some embodiments of the invention, one example of which is denoted generally at 100. In general, various backup and restore operations, among others, can be performed in the operating environment 100. Such operations may include, for example, initiating a backup, generating backup streams, performing a backup, categorizing files, storing a backup, or restoring a backup.

The operating environment 100 may include any number of clients 102, such as clients 102a, 102b . . . 102n, that each host one or more applications 104, 106 or 108. In general, the applications 104, 106 and 108 are not limited to any particular functionality or type of functionality, and in connection with their operation, the applications 104, 106 and 108 generate new and modified data that is desired to be backed up. Example applications include, but are not limited to, email applications, database applications, filesystems, CAD applications, audio applications, video applications, and datastores.

Each of the clients 102 additionally includes a backup agent 110, 112 or 114 that cooperates with a backup application, discussed below, to create backups of data stored locally at the clients 102. The backup agents 110, 112 and 114, in turn, each include a categorization engine 110a, 112a and 114a that, in general, operates to categorize data that is to be included as part of a backup dataset.

While not specifically illustrated in FIG. 1, one or more of the clients 102 may include a local configuration file. The local configuration file may include parameters relating to past, present, and/or future backups performed with respect to the data of the client 102. Such parameters may include for example, identification of files, filesystems, and folders that are to be backed up, backup destinations for the files, filesystems, and folders, and categorization information for the files, filesystems, and folders, examples of which are disclosed elsewhere herein. The settings in the local configuration file can be user-defined. By way of illustration, a setting in a local configuration file may specify that files <1 GB in size should be stored in primary storage, while files ≥1 GB should be stored in secondary storage.

As further indicated in FIG. 1, the operating environment 100 includes a backup server 200 that includes a backup application 202. The backup application 202 cooperates with the backup agents 110, 112 and 114 to create backups of data generated by the applications 104, 106 and 108, and stored at the clients 102a, 102b, and 102n. In some embodiments, the backup server 200 comprises a Dell-EMC Avamar server, or a Dell-EMC Networker server, although neither of those particular implementations is required for any embodiment.

When the backups have been created, the backup server 200 communicates with a storage array 300 to store the backups. In some example embodiments, the storage array 300 can comprise, or consist of, the Dell-EMC Data Domain environment, a global storage area network (GSAN), or storage area network (SAN). None of these particular implementations is required however.

In the illustrated example, the storage array 300, which can be, for example, a cloud datacenter, on-premises storage, or any other type of storage system or configuration or combination thereof, includes storage 302 and storage 304. The storage 302 can include, for example, primary storage 302a and secondary storage 302b, which may be isolated from each other, and may comprise the same, or different, respective types of storage. The storage 304 may be the same, or different, type of storage as storage 302, and storage 302 and storage 304 may be isolated from each other so that in the event of the failure of one, the other is not compromised. Backups stored in the storage array 300 can be recovered by the backup application 202 and restored to a host 102.

In one example implementation of the storage array 300, one of the storage 302 or storage 304 may comprise the Dell-EMC Data Domain storage environment, while the other of the storage 302 or storage 304 may comprise a GSAN. As discussed below, the particular destination and type of storage where a particular file is stored can be a function of a category, which may be based on file size, that has been assigned to that file. For example, and with reference to a particular backup dataset, files in the backup dataset equaling or exceeding a certain size may be backed up in Data Domain storage, while smaller files of the backup dataset may be backed up on a GSAN.

As well, a user at a host 102 can access the storage 300 directly and/or by way of the backup server 200 to locally mount a file, or files, that are stored at storage 300 as part of a backup. To this end, a user interface (UI) can be provided at the client 102, such as a command line interface (CLI) or graphical user interface (GUI) for example, to facilitate such user operations.

B. Example Host Configuration

Figure 2:
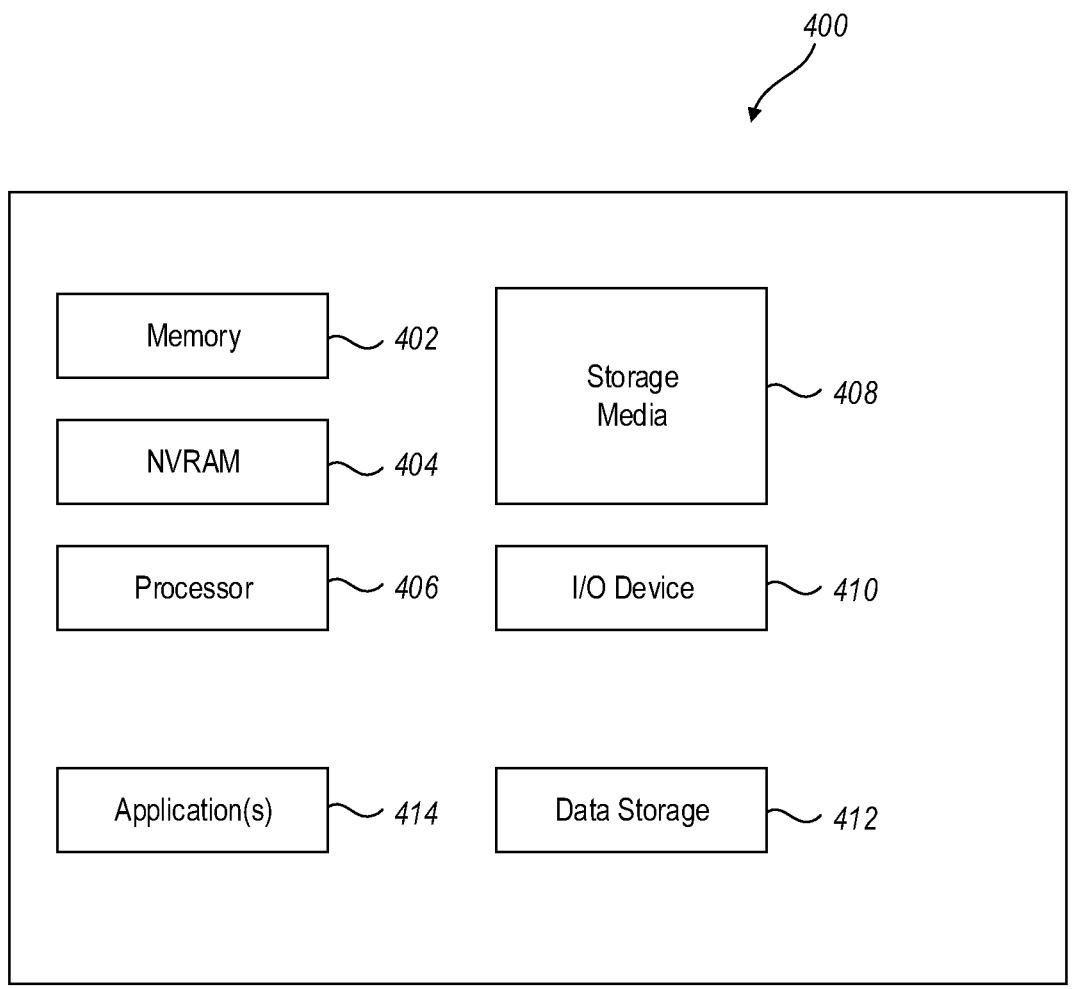
FIG. 2 discloses aspects of an example physical computing device configuration.

Turning briefly now to FIG. 2, any one or more of the clients 102, backup server 200, storage 302, and storage 304 can take the form of a physical computing device, one example of which is denoted at 400. In the example of FIG. 2, the physical computing device 400, which may be a host, includes a memory 402 which can include one, some, or all, of random access memory (RAM), non-volatile random access memory (NVRAM) 404, read-only memory (ROM), and persistent memory, one or more hardware processors 406, non-transitory storage media 408, I/O device 410, and data storage 412. One or more of the memory components of the physical computing device can take the form of solid state device (SSD) storage. As well, one or more applications 414 are provided that comprise executable instructions. Such executable instructions can take various forms including, for example, a data categorization application, a backup agent application, a backup application, a restore application, a backup and restore application, and any application that enables mounting of a backed up file at a client.

C. File Categorization and Storage

As noted herein, files in a backup dataset can be categorized, and then stored in a particular location based upon the assigned category. In at least some example embodiments, files are categorized by their size. Any number of size categories can be used, with a simple case involving only two categories, namely, a first category for files whose size is ≤ a particular size, and a second category for files whose size is > the particular size. In other examples, more than two file size categories can be used. To illustrate, one particular example embodiment employs the following five file size categories: 1-500 MB; 500 MB-1 GB; 1 GB-2 GB; 2 GB-4 GB; and >4 GB. More generally, any number of file size categories, embracing any range(s) of file sizes, can be used. In other instances, files may additionally or alternatively be categorized based on their size relative to a size of another file in the backup dataset.

In still other embodiments, files may additionally or alternatively be categorized based on other file metadata, such as their file type for example. This may avoid the need, in some instances, for file size measurements or comparisons. For example, it is often the case that video files and CAD files are quite large relative to some other file types. Thus, for example, it may be assumed for the purposes of categorization that a file having a .avchd or .stp file extension is a relatively large file that should be stored separately from, for example, a file having a .doc or .xls file extension. As well, some file extensions do not necessarily indicate the specific nature of a file but may still provide a useful basis for categorization. For example, some files include a .zip extension. These may be referred to as zip files. The .zip extension does not convey any information concerning the specific type or nature of files that have been compressed and 'zipped' but the fact that those files have been compressed into a zip file may permit an inference that one or more of the compressed files are relatively large. Thus, it may be assumed for the purposes of categorization that a file with a .zip extension is a relatively large file that should be stored separately from, for example, relatively smaller files having, for example, a .doc or .xls file extension.

Still other types of file based metadata may be used for the purpose of categorization. For example, an operating system (OS) such as the Apple Mac OS employs type codes to identify file format. As well, some file types do not include a period delimited extension, but include the file type within the filename itself. One example of this is UNIX OS filesystems. However, these file types can nonetheless be used for categorization purposes as well.

It should be noted that the foregoing are presented only by way of example. More generally, any file metadata that may be indicative, either directly or inferentially, of the size of the file, can be used as a basis for categorization and, thus, storage of the file. It should further be noted that multiple types of metadata may collectively serve as a basis for categorization. For example, one category might embrace 'all files of extension X and size>Y.' Other forms may also be used for categorizations, such as 'all files of either extension X or size>Y.'

In order to facilitate categorization of files in a backup dataset, embodiments of the invention employ a categorization engine. One example of a categorization engine is discussed above in connection with FIG. 1. In general, the categorization engine is an intelligent engine which operates to parse all files and folders identified in a backup request received, for example, at a client, and the categorization engine then categorizes the files and folders. In some embodiments at least, the categorization engine is an element of a backup agent operating on a client, although that is not necessarily required. The categorization agent may alternatively operate as a stand-alone entity on the client. Alternatively, the categorization agent may reside at the backup server and can parse the files and folders of a backup dataset before the backup dataset datastreams are transmitted from the backup server to storage. More generally, the categorization engine can reside and operate anywhere its functionality can be used to categorize files before storage.

In addition to categorizing files, the categorization engine may, after categorizing the files, also initiate a respective backup stream corresponding to each category that has been assigned to one or more files. If a category is defined or provided for, but no files have been assigned that category, then no backup stream is created by the categorization engine for that category. In at least some embodiments, the backup dataset is deduplicated, by the backup server or backup agent for example, prior to being stored in storage. Data deduplication may be performed before or after categorization by the categorization engine.

The categorization engine and/or another entity, such as the backup agent or backup server, may encrypt the backup dataset. This encryption may be performed prior to creation and transmission of the backup dataset datastreams. In this way, the backup dataset is in an encrypted form when it is stored in storage. When the dataset is restored, or otherwise accessed, from storage, the dataset is still encrypted and must be decrypted at the backup server and/or client by way of which the data is requested to be accessed. As a result of this arrangement, the user has assurance that the backup dataset will not be compromised during transmission to/from storage, or while stored in the storage.

D. Categorization in Backup Processes and Policies

Backup agents in accordance with various of the disclosed embodiments may operate in a variety of different ways. For example, in some embodiments, a backup agent may implement a multiplexing process in which data from different clients is combined together in a single stream by the backup agent and then written to a single device. In other embodiments, a multistreaming approach is employed in which a backup agent streams each of a plurality of backups from a single client to a respective destination.

In still other embodiments, a single backup policy is configured for a client and based on metadata such as the type and/or size of the files. In such embodiments, the backup data is written to appropriate storage devices based on Recovery Time Objective (RTO) and Recover Point Objective (RPO). In this approach, the backup agent first categorizes the data files into multiple sub-entities based on file metadata, and then streams the data to the different appropriate storage devices based on RTO and RPO. Thus, each category may correspond to a respective backup stream. This increases the performance of the overall backup and reduces the backup window for a client, since the client data is being backed up in parallel streams. Also, the user may define a single backup policy that embraces multiple categories and backup datastreams, and is not required to create and manage multiple backup policies.

With regard to the aforementioned example backup policies, RTO refers to a target time that is set for recovery of the data after a problem has occurred, and thus indicates how quickly a recover and restore of the data must be performed. The RTO may be based, for example, on the criticality of the data to operations of a business entity. For example, if the RTO is set at 4 hours, the lost/compromised data must be recovered and restored within 4 hours of the loss.

On the other hand, RPO concerns how much data loss may be acceptable to an entity. Thus, RPO may be determined by considering the amount of time elapsed between two backups, and then determining how much data may potentially be lost between those backup times. For example, a data loss occurring immediately after the earlier of two backups would be relatively small, while a data loss occurring immediately prior to the later of the two backups would be relatively large. The RPO is a way to express how much time an entity is willing to spend trying to recover, or recreate, the lost data. As such, the RPO may serve as an input when deciding how often data will be backed up. For example, if an entity is not willing to spend more than 2 days trying to recover or recreate lost data, then the time between successive backups should be no more than 2 days.

As is apparent, the RTO and RPO metrics have different purposes. In particular, the RTO may be applied at an enterprise level for example, and as such considers the entity and its systems as a whole. On the other hand, the RPO is specifically concerned with data, and the ability of the entity to sustain a data loss.

E. File and Filesystem Access

After the backup dataset has been stored, at a datacenter for example, a user is able to access the backed up data in various ways. For example, files from a backup can be restored locally to a user machine such as a client and/or files from a backup can be locally mounted at the user machine without being restored. Restoration may be employed for relatively small files, while local mounting may be used for relatively large files. However, no particular approach is required for any particular file size or type.

Restoration of a file or files may take place by way of the backup server. Because the backup dataset may be encrypted, security features can be implemented to enable the user to restore the files. For example, the AAA (Authentication, Authorization and Accounting) security protocol can be employed to this end. This protocol may be especially useful for applications such as network access or IP mobility. As well, this protocol can be applied in both local and roaming situations. No particular security protocol or application is required to be used however.

As well, during the backup process, the backup server and/or other entity may collect various information that can be used later as a security check when a user wishes to access a backed up file. For example, user profile information that is specified to the user (examples of which include username, access credentials and/or other information), and machine information (examples of which include hostname and IP address) concerning the machine from which the data is backed up, can be collected and stored.

When the user submits a request to access, such as by restoration, a stored file, the credentials or other information submitted with the access request can be compared, for example by the backup server, with the information that was collected during the backup process, and if a match occurs, the user will be granted access. If there is no match, the access request will be denied.

As noted herein, relatively large files and filesystems residing in storage as part of a backup dataset may take a significant amount of time to restore to a local user machine. Accordingly, it may be more convenient for the user to simply mount the file or filesystem locally. Local file mounting may enable the user to access the file(s) of filesystems of interest much more quickly than if those files or filesystems were to be restored. Various applications and systems can be used to locally mount files at a user machine or other entity. For example, the Common Internet File System (CIFS) enables the mounting of networked drives on servers and other machines using the Linux or Windows operating system (OS). As another example, the Network File System (NFS) enables a user on a client computer to access files over a network in a way that mimics how local storage is accessed. The scope of the invention is not limited to these example mounting systems and applications, nor to any particular OS, however.

F. Aspects of Some Example Methods

Figure 3:
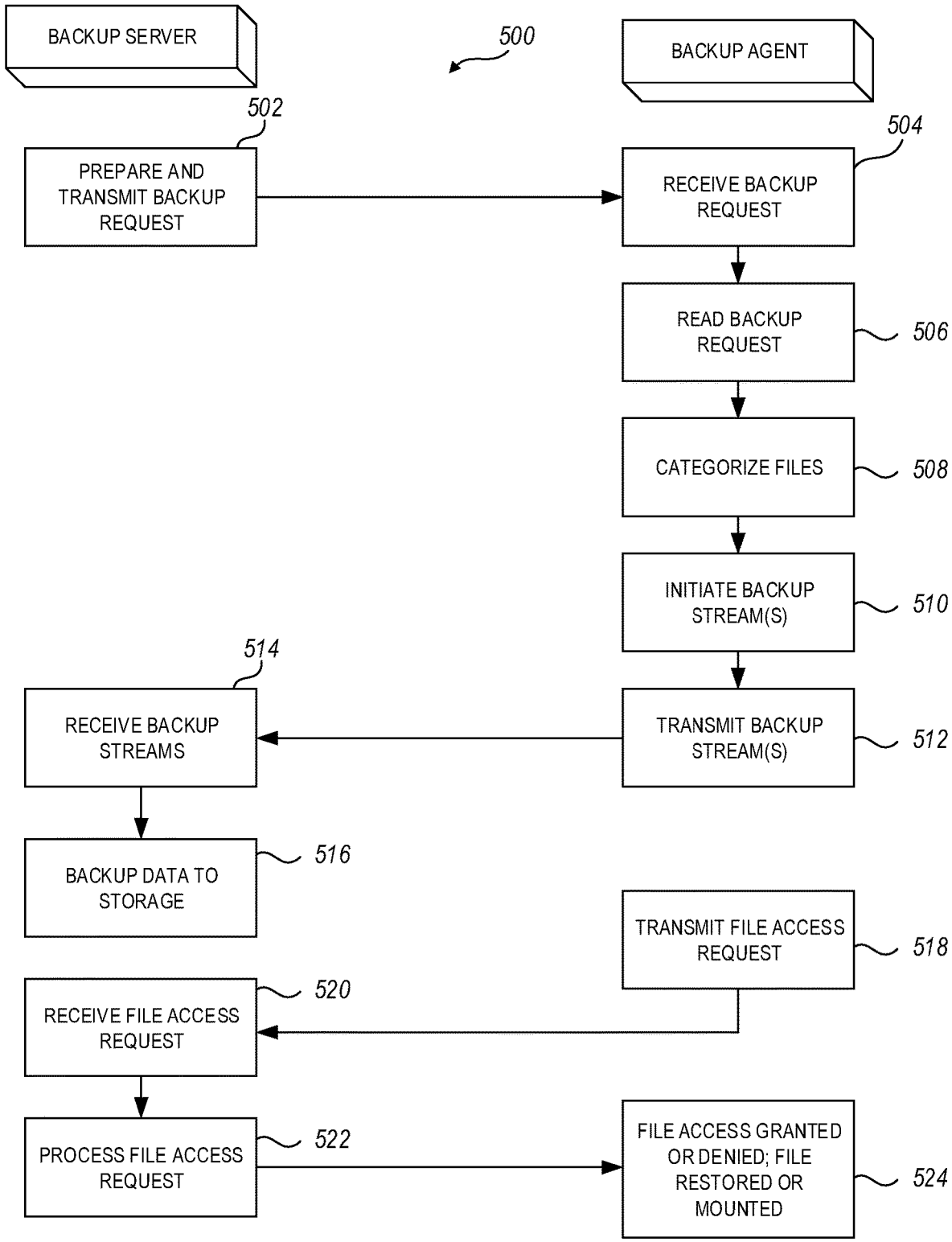
FIG. 3 is a flow diagram illustrating aspects of an example method for data backup and categorization.

With attention now to FIG. 3, details are provided concerning some example methods for categorizing and storing the data of a backup dataset, where one example of such a method is denoted generally at 500. The method 500 can be performed in an operating environment such as the example operating environment 100 in FIG. 1, although no particular operating environment is necessarily required. In some embodiments at least, part or all of the method 500 can be performed by a backup agent residing on a client whose data is desired to be backed up. The example method 500 can be performed in association or cooperation with a backup application of a backup server.

The example method 500 can begin when a backup request is prepared and transmitted 502, such as by a backup server. The backup request may identify files and folders of a client that are to be backed up. As well, the backup request may include one or more categories, such as file size ranges for example, that can be used to apply a category to each of the identified files and folders. Finally, the backup request may also specify a respective storage destination for each of the identified categories. Information specified in a backup request can be assigned automatically, or manually by a user, such as with a CLI or GUI at the backup server.

The backup request is received 504 from the backup server. In some embodiments, the backup request is received by a backup agent at a client. The backup agent may include, for example, a categorization engine plugin that receives 504 the backup request from the server.

After receipt 504 of the backup request, the backup agent may either use the backup parameters specified in the backup request, or the backup agent can override the backup request and obtain the backup parameters from a local configuration file 506. The local configuration file may be used where, for example, the backup request includes an incomplete, or erroneous, set of backup parameters, or where the backup parameters in the local configuration file were specified more recently than the backup parameters in the backup request. These circumstances are provided only by way of example, and other criteria may be used to determine when and if backup parameters of a backup request will be overridden by the backup agent.

In any case, once the categorization information is obtained, whether locally or from the backup request, the categorization engine of the backup agent then categorizes 508 the files, filesystems, and/or folders identified in the backup request, using the categorization information. After categorization is completed 508, the categorization engine then initiates 510 a backup stream for each category that was assigned to at least one file. Each of the initiated backup streams is directed to the storage destination that corresponds to the category with which that backup stream is associated.

The backup streams are then transmitted to the backup server 512. The backup server receives 514 the backup streams, and backs up the data to storage 516. At some time subsequent to backup 516, the client, acting by way of the backup agent for example, transmits a file access request 518 which is received 520 and processed 522 by the backup server. With respect to such processing, if the requested file is relatively small, as compared to a defined threshold or range for example, the backup server may simply restore 524 the file to the client from which the file access request was received. On the other hand, if the requested file is relatively large, such as a video file or CAD file, the backup server may transmit user credentials contained in the file access request to the storage entity so that the user can be authenticated and authorized to locally mount 524 the file, rather than having to restore the file.

Where a restore process is performed, it may proceed relatively faster than a conventional restore process. For example, because respective portions of the backup dataset are restored from different respective destinations, multiple restore streams can be initiated, and the restore streams can operate simultaneously, or at least overlap in time to some extent. On the other hand, a conventional process may use only a single restore stream and thus may proceed more slowly than a restore process that used multiple restore streams. A restore command that may be used to initiate multiple restore streams can be entered at a backup server for example, and may specify a list of files to be restored, the respective location of each file, and a particular time point.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   improving user access to data that is stored in a computing system, by performing the following operations with a backup agent that is hosted on a client:
   receiving, by the backup agent from a backup server, a backup request that defines a backup dataset that includes a plurality of files, and one or more of the files in the plurality of files has a different respective size than respective sizes of one or more other files in the plurality of files, and the backup request includes backup parameters that specify one or more storage destinations for the files of the backup dataset;

overriding, by the backup agent, the backup request when the backup request includes an incomplete or erroneous set of backup parameters, and when, the backup request is overridden, the backup agent obtains a set of backup parameters from a local configuration file;

after the backup request has been received, parsing the files of the backup dataset;

after the files have been parsed, categorizing, by a categorization engine of the backup agent, each of the files in the backup dataset by assigning one of a plurality of different file size categories to each file;

initiating, by the categorization engine, a respective backup datastream corresponding to each different file size category that has been assigned;

transmitting the backup datastreams to respective storage destinations;

requesting, by the categorization engine, that each backup datastream be backed up at the storage destination that corresponds to the assigned file size category associated with that backup datastream;

after the backup datastreams have been backed up, transmitting, by the backup agent to a backup server, a file access request; and wherein when a size of a file specified in the file access request is below a defined threshold, the file is received directly by the client, and when a size of the file is above a defined threshold, the client receives user credentials instead of the file, and the user credentials enable a user to be authenticated and to locally mount the file.

2. The method as recited in claim 1, further comprising restoring the backed up data streams, and the restoring comprises initiating multiple restore streams respectively corresponding to the backed up datastreams, and the restore streams at least partly overlap in time with each other.

3. The method as recited in claim 1, wherein the backup dataset includes a file system and a file folder, and the method further comprises categorizing the file system and the file folder.

4. The method as recited in claim 1, wherein assigning a file size category comprises assigning a category to a file in the backup dataset based on a relative size of that file with respect to another file in the backup dataset.

5. The method as recited in claim 1, wherein the one of the files to be backed up resides at the client.

6. The method as recited in claim 1, wherein two or more of the backup data streams are either: transmitted together as a multiplexed stream to a single storage destination; or, multistreamed as separate backup data streams to different respective storage destinations.

7. The method as recited in claim 1, further comprising locally mounting a file that was contained in a first backup datastream, wherein the mounted file is larger in size than each file in a second backup datastream.

8. The method as recited in claim 1,
wherein when the file is locally mounted, the file is locally mounted without necessitating a full restore of the backup dataset, and without requiring user knowledge of an identity of a restore point associated with the file.

9. A non-transitory storage medium having stored therein instructions which are executable by one or more hardware processors to perform operations comprising:

improving user access to data that is stored in a computing system, by performing the following operations with a backup agent that is hosted on a client:

receiving, by the backup agent from a backup server, a backup request that defines a backup dataset that includes a plurality of files, and one or more of the files in the plurality of files has a different respective size than respective sizes of one or more other files in the plurality of files, and the backup request includes backup parameters that specify one or more storage destinations for the files of the backup dataset;

overriding, by the backup agent, the backup request when the backup request includes an incomplete or erroneous set of backup parameters, and when, the backup request is overridden, the backup agent obtains a set of backup parameters from a local configuration file;

after the backup request has been received, parsing the files of the backup dataset;

after the files have been parsed, categorizing, by a categorization engine of the backup agent, each of the files in the backup dataset by assigning one of a plurality of different file size categories to each file;

initiating, by the categorization engine, a respective backup datastream corresponding to each different file size category that has been assigned;

transmitting the backup datastreams to respective storage destinations;

requesting, by the categorization engine, that each backup datastream be backed up at the storage destination that corresponds to the assigned file size category associated with that backup datastream;

after the backup datastreams have been backed up, transmitting, by the backup agent to a backup server, a file access request; and wherein when a size of a file specified in the file access request is below a defined threshold, the file is received directly by the client, and when a size of the file is above a defined threshold, the client receives user credentials instead of the file, and the user credentials enable a user to be authenticated and to locally mount the file.

10. The non-transitory storage medium as recited in claim 9, further comprising restoring the backed up data streams, and the restoring comprises initiating multiple restore streams respectively corresponding to the backed up datastreams, and the restore streams at least partly overlap in time with each other.

11. The non-transitory storage medium as recited in claim 9, wherein the backup dataset includes a file system and a file folder, and the method further comprises categorizing the file system and the file folder.

12. The non-transitory storage medium as recited in claim 9, wherein assigning a file size category comprises assigning a category to a file in the backup dataset based on a relative size of that file with respect to another file in the backup dataset.

13. The non-transitory storage medium as recited in claim 9, wherein one of the files to be backed up resides at the client.

14. The non-transitory storage medium as recited in claim 9, wherein two or more of the backup data streams are either: transmitted together as a multiplexed stream to a single storage destination; or, multistreamed as separate backup data streams to different respective storage destinations.

15. The non-transitory storage medium as recited in claim 9, wherein the operations further comprise:

wherein when the file is locally mounted, the file is locally mounted without necessitating a full restore of the backup dataset, and without requiring user knowledge of an identity of a restore point associated with the file.

16. The non-transitory storage medium as recited in claim 9, wherein the operations further comprise locally mounting a file that was contained in a first backup datastream, wherein the mounted file is larger in size than each file in a second backup datastream.

17. The non-transitory storage medium as recited in claim 9, wherein the operations further comprise collecting user profile information and machine information during backup of data in the backup datastreams.

18. A server comprising:
one or more hardware processors; and
the non-transitory storage medium as recited in claim 9.

* * * * *